Sept. 8, 1953 C. W. EARP 2,651,774
RADIO DIRECTION FINDER.
Filed Feb. 17, 1951 2 Sheets-Sheet 1

*Inventor*
CHARLES W. EARP
By *RP Morris*
*Attorney*

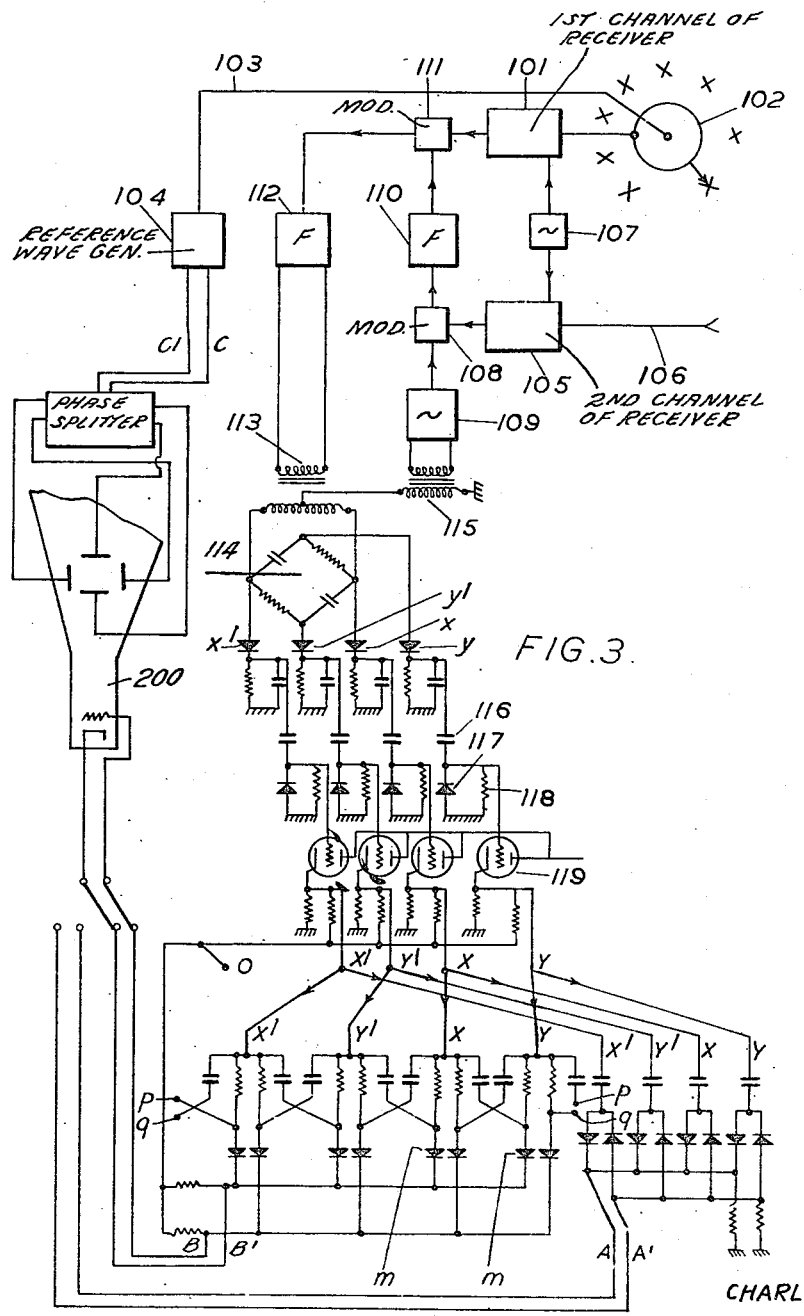

Patented Sept. 8, 1953

2,651,774

UNITED STATES PATENT OFFICE 2,651,774

RADIO DIRECTION FINDER

Charles William Earp, London, England, assignor to International Standard Electric Corporation, New York, N. Y., a corporation of Delaware Application February 17, 1951, Serial No. 211,522
In Great Britain February 17, 1950

9 Claims. (Cl. 343—120)

The present invention relates to radio direction finders of the type in which the bearing of a signal is obtained by phase comparison of a locally generated reference wave with a bearing wave which is derived from phase modulation of the received energy due to cyclical change of the position of the energy-collecting point round the circumference of a circle. The main object of the invention is to provide a direction finder of the type specified in which means is provided for eliminating bearing errors which might be set up by reaction from a mast or other metallic structure located at the centre of the circle.

One of the greatest difficulties associated with automatic radio direction finding is the provision of permanent and automatic sense of bearing. When not contrary to operational requirements of a D. F. system, it has been common practice to measure "direction" and "sense" at different moments, in order that accuracy of bearing determination should not be impaired by sense determining apparatus or circuits. One significant reason for this procedure was that a "sense" signal could not, in general, be extracted from an aerial system with the required precision of phase and amplitude. Thus though a sense signal of approximately ideal phase could resolve an ambiguity, it was liable to produce error if introduced actively in circuits used for accurate determination of bearing. In aural null D. F. it is not practicable to produce a satisfactory cardioid response pattern for direct determination of bearing, particularly when operation is required over a wide frequency band.

The "switched cardioid" D. F. system, an example of which is described in R. Keen's "Wireless Direction Finding," fourth edition, pp. 844–846, does at first sight appear to be satisfactory, but apparatus designed to cover a wide frequency range is limited seriously by the relative phasing of directional and sense signals. Though it is true that mis-phasing does not necessarily involve anything but a slight loss of sensitivity, in practice it is possible for circuit unbalances to result in reciprocal error. A practical investigation of variable phasing between sense and directional signals in an equipment of this type showed that relative phasing was a function of the elevation of the required signal, and that small changes in the height of the supporting mast could cause considerable variation. Such variation of phasing is, of course, due to interaction between the supporting mast and the central sense aerial. Signal currents in the mast, which constitutes an effective earth or counterpoise for the sense aerial, are dependent upon the direction of arrival of the signal in the vertical plane. Though it is true that a small amount of mis-phasing can cause little error, it should be realised that in an equipment which must cover a wide frequency range without re-adjustment, there are other sources of mis-phasing, so that additional mis-phasing due to mast interaction has the definite practical effect of reducing overall frequency coverage of satisfactory operation. Mis-phasing which is sufficient to cause reduction of signal sensitivity must, of course, accentuate site error, as "figure-of-eight" pick-up from reflecting obstacles is effectively random in phase with respect to the total sense signal.

The above preliminary consideration of mast interaction tends to suggest that difficulty with regard to "sensing" may be inherent. In order to demonstrate that this is not so, the following theoretical system is mentioned. Imagine a ring of $4n$ vertical aerials, arranged in a ring concentric with the supporting mast, and that connections from each aerial to common terminals are such that excitation of the total from these terminals would yield relative excitation of the separate aerials (in order) in relative phases 0°, 90°, 180°, 270°, etc. The directional pattern of such an aerial is a circle, and mast interaction is zero. Another concentric ring of $4n+4$ aerials yields a similar pattern, but the phase of the received signals varies over $2\pi(n+1)$ radians for one cycle of azimuth, instead of $2\pi n$ radians as for the first array. Added together, the two systems must yield a total directional pattern in the form of a cardioid, yet it is independent of mast interaction on individual aerials. Thus, we have a tool for D. F. which is not only unaffected by mast currents, but does not require a central sense aerial. This double-ring D. F. system demonstrates clearly that D. F. aerial systems can be built round a mast which could be used, simultaneously, for other purposes— a very significant advantage of any shipboard radio direction finder.

The Doppler D. F. system in which a single aerial is gyrated round a circular path to yield a phase-modulated signal which can be demodulated to yield directional information, has been seriously considered, not only from the standpoint of its excellent site error suppression characteristic, but also as a system requiring no sense aerial. Mast interaction with such a system causes a modification of the amplitude and phase envelopes of received signals, but, from symmetry, can cause no phase distortion of the fundamental frequency of modulation, unless the received signal due to mast reflection is greater than the required signal, when sense of phase modulation may be inverted.

Turning to a practical modification of the true Doppler system, the cyclical commutation of a receiver to a ring of fixed aerials as in direction finders of the type disclosed in U. S. Patent No. 2,521,702 granted September 12, 1950, one would at first sight expect to find a similar performance. Unfortunately, discontinuous sampling of the signal field is apt to lead to a repetitive error, the amplitude of which is a function of the amount of mast interaction.

In attempting to minimise mast interaction, it would seem that if the ring of aerials could be expanded to give a large spacing between mast and aerials, then the amount of signal received from the mast would be small, and the resulting error should be small. Unfortunately, as experimental work has demonstrated very clearly, unless the number of aerials is increased with diameter, repetitive error at first tends to increase rapidly. A simple consideration shows that if adjacent aerials receive wanted signals of reasonably similar phase, then the unwanted mast reflection, which injects a signal of equal phase to all aerials, can produce but a small differential error in the differential phase of adjacent aerials, the quantity used for bearing determination. When, however, adjacent aerials can receive wanted signals differing in phase by 180°, then a maximum differential error will be produced by "mast" signals. An aerial system of very large diameter would suppress error due to the presence of the mast, but if directional ambiguities are to be avoided without serious complexity of equipment, it would be necessary to use a very large number of aerials.

According to its most general aspect the invention resides in a radio direction-finding system of the type in which the bearing of a signal is obtained by phase comparison of a locally generated reference wave with a bearing wave which is derived from phase modulation of the received signal energy, said phase modulation arising from cyclically commutative connection of a radio receiver to different aerials of a circular array of aerials, said system being so arranged as to effect suppression of the effect in said receiver of the reaction on said array from a re-radiating metal structure, such as a supporting mast, centrally located within the circle of said array.

According to a feature of the invention there is provided a radio direction finding system comprising a circular array of aerials, a radio receiver including a frequency doubling stage operative on the received signal, commutator means for cyclically connecting said receiver to different aerials of said array two aerials at a time, means for locally generating a reference wave, means for synchronising said commutator means with said reference wave, and means for obtaining the bearing of a received signal by phase comparison between the phase of a wave derived from the phase modulation of the received signal energy arising from said cyclical connecting and the phase of said reference wave, said cyclical connecting means being so arranged that the effects in said receiver of the reactions from a re-radiating structure, such as a supporting mast, centrally located within said array on the two simultaneously connected aerials cancel each other.

According to another feature of the invention there is provided a radio direction finding system comprising a circular array of aerials, a radio receiver, commutator means for cyclically connecting said radio receiver to different aerials of said array, means for locally generating a reference wave, means for synchronising said commutator means with said reference wave means for obtaining the bearing of a received signal by phase comparison between the phase of a wave derived from the phase modulation of the received signal energy arising from said cyclical connecting and the phase of said reference wave, and means for suppressing the effect in said receiver of the reaction on said signal energy from a re-radiating structure, such as a supporting mast, centrally located within said array.

According to a more specific aspect of the invention there is provided a radio direction finding system comprising a circular array of aerials, a radio receiver, commutator means for cyclically connecting said receiver to different aerials of said array at a given frequency, means for locally generating a reference wave of said given frequency, means for synchronising said commutator means with said reference wave, means for deriving from a received signal a bearing wave of said given frequency corresponding to the phase modulation imposed on the received signal by said cyclical connecting, and means for obtaining the bearing of said signal by phase comparison between said bearing wave and said reference wave, said means for deriving said bearing wave including means for suppressing the effect on said bearing wave arising from the reaction between said aerials and a re-radiating structure, such as a supporting mast, centrally located within the circle of the array.

The invention will be better understood from the following detailed description of two embodiments, read in conjunction with the accompanying drawings in which:

Fig. 3 illustrates diagrammatically a second embodiment of the invention.

For the sake of simplicity these drawings are confined to such details as are necessary to the explanation of the invention; and the centrally located re-radiating structure, whose effect is to be suppressed, is not shown.

Figure 1:
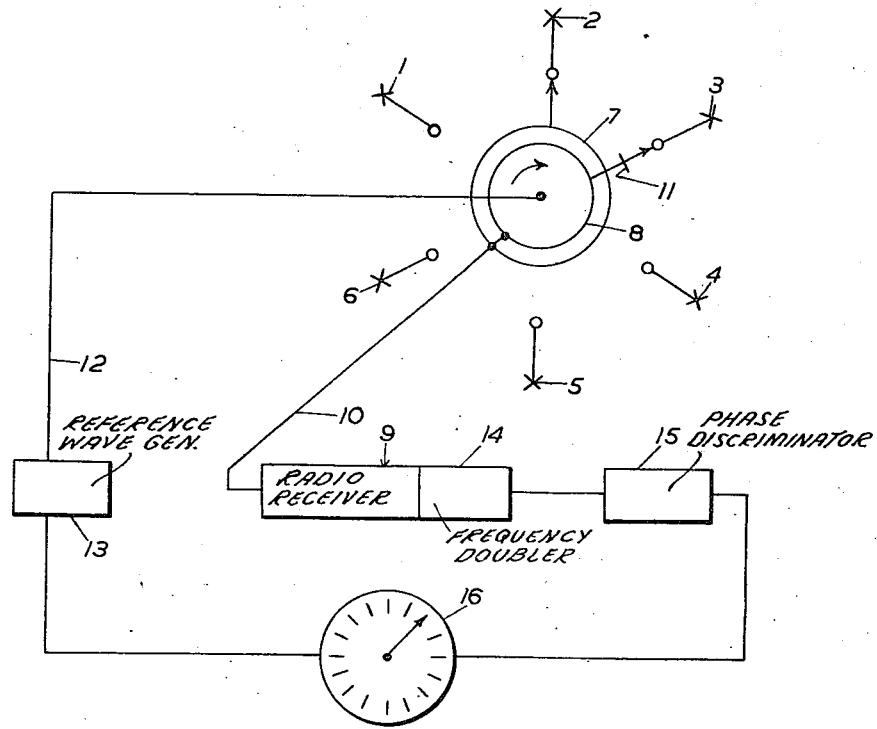
Fig. 1 illustrates diagrammatically an embodiment of the invention which depends in part on a particular form of circular aerial array.

Referring to Fig. 1, there is shown a direction finding system comprising a circular array of aerials 1 ... 6 with two synchronous commutator means, indicated at 7 and 8, adapted to connect the individual aerials of the array two at a time to a radio receiver 9 over connection 10. The commutators 7 and 8 are displaced in positional phase by one step of aerial commutation, so that at the moment illustrated in the drawing the receiver 9 is connected to aerials 2 and 3, while at the next commutation step it will be connected to aerials 3 and 4, and so on. The commutator connections are so arranged that the sense of the aerial connection made by one of the commutators, say 8, is reversed relative to the sense of the aerial connection made by commutator 7, this reversal being indicated on the drawing by the line 11 across the connection between commutator 8 and aerial 3. The synchronous commutators 7 and 8 may be of any convenient type, mechanical or electronic, suitable for the desired commutation speed, and are synchronised over line 12 with the output of a reference wave generator 13. The receiver 9, in addition to including the usual amplifying and frequency shifting means, further includes a frequency doubling stage, indicated at 14, operative at either the incoming carrier frequency or at the receiver intermediate frequency as preferred. The output from receiver 9 is applied to a means 15, such as a phase discriminator, adapted to derive from the phase modulation of the receiver output, arising from commutation of the receiver input round the circular array, a bearing wave the phase of which is determined by the direction of propagation of the received signal. This bearing wave thus obtained by means 15 is applied to a phase comparator 16, in which its phase is compared with that of the reference wave of the same frequency supplied by generator 13, the result of this comparison yielding the desired directional information.

As already mentioned, the effect of reaction from a re-radiating structure, such as a supporting mast, centrally located within the array, is to inject into each aerial a signal of equal phase for all aerials. It will be evident that with the aerials connected to the receiver two at a time in the manner indicated i. e., with a reversal in one of the connections, the reactions in the two connected aerials will cancel each other and not affect the receiver input. The two connected aerials behave in effect as an Adcock pair, and with the double commutator arrangement of Fig. 1, the six aerials of the array provide a like number of steps each of which is a step from one Adcock pair to another.

Figure 2:
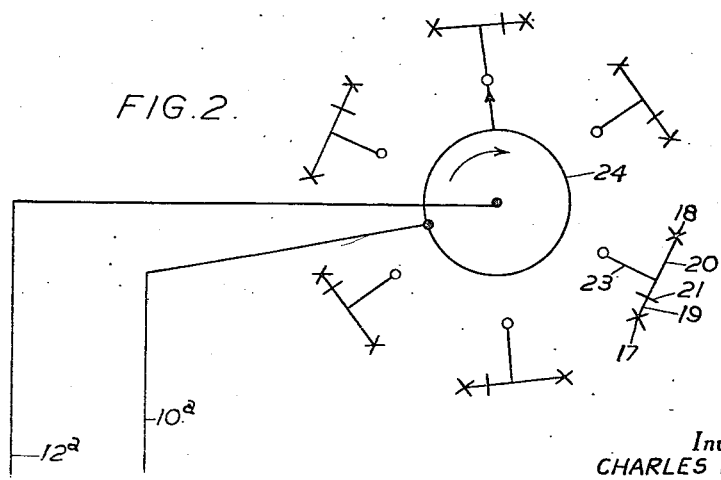
Fig. 2 illustrates a form of array alternative to that shown in Fig. 1.

Referring for the moment to Fig. 2 there is illustrated therein another aerial system which may replace that used in the arrangement of Fig. 1, but uses a single instead of a double commutator system, at the cost of doubling the number of aerials. This other aerial system comprises in the present case twelve aerials permanently connected in pairs to form six Adcock pairs. For example, the adjacent aerials 17 and 18 are connected by two transmission lines 19 and 20 of equal length, one of the transmission lines has a reversal or transposition as indicated by the cross line 21, the output of the Adcock pair thus formed being taken off to the 6-point single commutator 22 through line 23 which connects to the junction point of lines 19 and 20. Commutator 24 is synchronised with the reference wave generator 13, Fig. 1, over line 12a which replaces line 12 of Fig. 1 and the receiver 9, Fig. 1, is connected to the 12-aerial aerial through line 10a which replaces line 10 of Fig. 1. It will be observed that so far as reaction from a centrally located re-radiating structure within the array is concerned, there is no difference if the commutating and aerial arrangements forming part of Fig. 1 are replaced by those of Fig. 2.

Returning to Fig. 1, it will be clear that in such a system the signal delivered to the receiver 9 has imposed upon it the same steps of phase as the simple system, but also a considerable amplitude modulation, and also two unwanted phase reversals per cycle of commutation. Before demodulation of the signal it is necessary to remove these spurious phase reversals, but this is simply achieved by the already mentioned process of frequency doubling in the receiver 9 (Fig. 1). Though there is some danger, when the signal is theoretically at a null point of a particular "Adcock pair," that there may be, in fact, an appreciable signal of indeterminate phase due to site imperfection, error can be avoided by rejection of signal samples of relatively small amplitude before frequency doubling. The system suffers slightly from the occasional rejection of a signal sample, causing a magnified repetitive error, so that a larger number of individual aerials is required.

In a second embodiment of the invention elimination of the "mast component" of the signal received from the normal aerial system is accomplished by circuit means which will now be described in detail.

Referring to Fig. 3, block 101 represents one channel of a two-channel receiver and is connected successively to a ring of 9 aerials by the action of electronic commutator 102 synchronized over line 103 by reference wave generator 104. 105 is the other channel of the receiver and is permanently connected to a fixed aerial 106, and tuned to the same frequency as 101. Signal derived from 106 is used basically as a frequency reference, phase and amplitude having no particular significance. The block 107 represents any frequency changing oscillator or oscillators which must be common to the two receiver channels, so that the output frequency from each channel is exactly the same.

In modulator 108 the output frequency of 105 is displaced by a fixed and constant amount (say F cycles/sec.) by oscillator 109 (which operates at F cycles/sec.), and the displaced frequency is selected by filter 110.

Output from filter 110 beats with output from 101 in modulator 111 to yield an output to filter 112 at the frequency of oscillator 109 i. e. at exactly F cycles/sec. This output has imposed upon it, of course, the steps of phase-modulation caused by the position-commutation of the aerial connected to 101.

The next step is to split the phase of the output from filter 112 via transformer 113 and phase splitting circuit 114 into four values, relatively spaced at intervals of 90 degrees, and to each output is added via transformers 115 and 114, in the same phase to each output, a reference wave of the same frequency from oscillator 109. The four combinations are applied to four separate rectifiers which yield, at the points $y$, $x$, $y^1$, $x^1$, four direct current potentials relative to earth which are proportional to the four voltages applied to the rectifiers; for reasons which will presently become apparent, these four potentials may be conveniently referred to collectively as the "circle voltage."

Now, for the sake of explanation, let us imagine that $y$, $x$, $y^1$, $x^1$, are connected to four corresponding deflecting plates of a cathode ray oscillograph. When no signal is present in 101 and/or 105, and therefore no signal in filter 112, the input to the four rectifiers from oscillator 109 produces four equal potentials at $y$, $y^1$, $x$, $x^1$, and there is no deflection of the C. R. trace. When signal appears in filter 112, then the C. R. trace will be deflected in some direction dependent upon the relative phase of signals from oscillator 109 and filter 112. The C. R. O. is, in fact, a phase meter.

Consider, now, that 101 is connected to a smoothly gyrating aerial, and that there is no mast interaction, when output from 112 will be phase modulated sinusoidally with an excursion in radians equal to $$\frac{2\pi\gamma}{\lambda}$$

where $\gamma$ is the radius of aerial gyration. This will cause a smooth oscillation of the C. R. spot, backwards and forwards round a circular arc centered on zero deflection, the total arc extending over $$\pm \frac{2\pi\gamma}{\lambda}$$

radians. If the radius of gyration of the aerial is $$\frac{\lambda}{2}$$

or greater, then the C. R. O. traces out a complete circle.

Now, we suppose that mast interaction causes a further constant signal, unmodulated in phase because the gyrating aerial is always at the same distance from the central mast. The effect of this spurious signal is simply to deflect the whole C. R. trace in some direction which could not be predicted. It is important to notice that a steady signal only, due to mast interaction, produces a steady deflection, that the wanted signal produces an arc or circle centred on the zero-signal or zero deflection position, and that the combined effect of the two signals causes a simple linear addition of the two effects on the C. R. O. No matter what are the relative strengths of "wanted" and "mast reflection" signals, and what amplitude and phase distortion is produced by adding together the two signals, the C. R. trace remains circular, its radius being proportional to the strength of wanted pick-up, and the angle of total arc being equal to $$\frac{4\pi\gamma}{\lambda}$$

If, now, one could cause an automatic "correct" re-centring of the C. R. trace, results would be completely independent of mast interaction.

Evidently, if the C. R. O. were connected via condensers which remove the "D. C. component" of the trace, the trace would be independent of mast interaction. The centering would not be the desired one, however, for a very small arc would not be "held off" the centre by the correct radial deflection. The effect would be identical to the removal of the whole "carrier" component of the received signal, a simple removal of the original unmodulated frequency, whether derived from mast or otherwise. (It is true that corresponding to certain radii of gyration of the aerial, actually when the Bessel function $J_0$ $$\left(\frac{2\pi\gamma}{\lambda}\right)=0$$

there is no carrier component of the wanted signal, and correct centring would then be obtained.)

It will now be assumed that the diameter of gyration is equal to or greater than $\lambda$, when a full circle will be displayed. If the circle component of trace corresponds to fluctuations of $\pm v$ volts at each of the points $y$, $y^1$, $x$, $x^1$, then application of these voltages through large condensers such as indicated at 116, each to a rectifier 117 shunted by a large resistance 118, as shown in the figure, then the new potentials appearing across the four new rectifiers will have negative peaks of zero, or earth potential, and positive peaks of $2v$ volts positive.

These "D. C. restored" potentials are now applied to cathode followers such as 119 for output impedance reduction, and yield the same potential cycles at Y, Y¹, X, X¹. Four resistors taken to a common point O give the circle-centre voltage of $v$ volts above earth.

Departing from the preferred technique given in the figure, it will now be seen that if voltages OY, OX, OY¹, OX¹, were used to modulate linearly four equal outputs of relative phase 0, 90°, 180°, 270°, from any constant frequency source, then the combined modulated outputs would constitute a phase modulated wave bearing exactly the same modulation that would be imposed upon the signal from the gyrating aerial, but with all mast-reflection signal removed. Thus, well-known discriminator technique could be used to provide directional information.

Returning to preferred technique, Y, X, Y¹, X¹, are connected via eight resistances, two from each point, to eight rectifiers. The latter are connected in groups of four to terminals B, B¹, and load resistors return to the point O. From each of the points Y, X, Y¹, X¹, are connected two condensers, one to a rectifier which is resistance connected one pole earlier on the Y, X, Y¹, X¹, system, and the other in similar manner one pole later. This rectifier arrangement is the same as the corresponding portion of the discriminator described in the applicant's prior U. S. Patent No. 2,567,194 granted September 11, 1951.

Consider now that the instantaneous position of the C. R. trace is in the Y OX quadrant, and that motion is clockwise. Each rectifier receives direct voltage from the Y, X, Y¹, X¹, system plus differentiated voltage. In the case chosen, Y is positive, and rate of change of X is positive. These effects are additive on two rectifiers (marked $m$), and these two rectifiers pass positive potential to B. Under the condition chosen no other rectifier passes appreciable current. A careful study will show that for any position of the imaginary C. R. spot, two rectifiers will produce positive potential at B for clockwise rotation, or that two rectifiers will produce positive potential at B¹ for anti-clockwise rotation. For a more detailed explanation reference may be made to the already mentioned U. S. Patent No. 2,567,194. Output from BB¹ represents the phase modulation envelope of the original signal, and phase comparison on cathode ray tube 200 between the output from BB¹ controlling the beam brightness and output at CC¹ from the reference wave generator 104 producing a constant rotation of the beam will yield an unambiguous measurement of the bearing. The further rectifier system which feeds the terminals AA¹ is coupled via small condensers to the polar points Y, X, Y¹, X¹, of the circle voltage, and yields a unidirectional output corresponding to the velocity of the imaginary C. R. O. spot. This results in output at twice the frequency of the aerial gyration, and this may be used for measurement of bearing with sense ambiguity. It should be noted that, in principle, this rectifier system could be derived from input from $y$, $x$, $y^1$, $x^1$, instead of Y, X, Y¹, X¹, as it operates only from movement of the C. R. O. spot. Thus, so far as this harmonic discriminator is concerned, D. C. elimination from the $y$, $x$, $y^1$, $x^1$, system, and re-centering of the circle, have no significance. Mast interaction on this system has no effect whatever, despite possible imperfect D. C. restoration of the "circle voltage."

Up to the present, performance of circuits has largely been confined to a consideration of smooth aerial gyration. When such gyration is replaced by positional commutation, the imaginary C. R. O. circle display becomes a series of well-defined "spots" arranged on the circumference of a circle.

If adjacent aerials are spaced very closely together, then the practical result is very similar to that which would be obtained by smooth gyration. In some cases, however, as for example when using a single aerial system for a wide range of frequency, it may be necessary to make adjacent aerial spacing large enough to produce correspondingly large differences of phase. In the demodulating circuits already described some difficulty could be caused by irregular distribution of the spots and round the circle, when the D. C. restoring rectifiers (on the grids of the cathode followers) cannot operate correctly. The significance of this defect is not very great, for the reason that exact bearing information may be determined by output from $AA^1$ which is independent of circle centring. Output from $BB^1$ may be reserved for resolution of ambiguity only, when great precision is not required.

If a certain circuit complexity may be permitted, the defect may be entirely removed by modification or replacement of the reference wave from oscillator 109 which is applied to the circle voltage producer. This reference wave may, for example, be displaced in frequency by a very small amount, that is, a small amount compared with the aerial commutation frequency, when the circle diagram would rotate continuously, hence enforcing the full peak-to-peak diameter voltage onto the D. C. restoring rectifiers. Actually, the single condenser coupling from $y$, $x$, $y^1$, $x^1$, would be replaced by T-section high pass filters in order to maintain a long time-constant on the D. C. restoring rectifiers while removing the rotating voltage due to mast interaction.

A more practical method is to phase-modulate, at very low frequency, the reference oscillation from 109 before application to the circle voltage producer. This permits correct D. C. restoration of the circle centre, and though the phase modulation envelope imposed on the reference wave appears in the output at $BB^1$, this can easily be filtered from the required output.

Now it becomes necessary to examine the effect of phase steps of appreciable magnitude on the D. C.-restored circle voltage defined by Y, X, $Y^1$, $X^1$. So far as the eight-detector demodulator which feeds $BB^1$ is concerned, output is delivered during spot motion only, and the amount, will be roughly proportional to the sine of angular change of position of the spot. In other words, output from $BB^1$ is the same as would be obtained from the normal type of frequency discriminator operating from the phase-stepped signal from the commutated aerial, except for the very important difference that mast interaction has been avoided entirely. Output waveform from $BB^1$ takes the form of the Bessel function series:

$$J1\left(\frac{2\pi d}{\lambda}\right) \text{sine } 2\pi ft + J3\left(\frac{2\pi d}{\lambda}\right) \text{sine } 6\pi ft + \ldots$$

where $d$=spacing between adjacent aerials.

In a similar manner assuming square law detectors in the demodulator feeding $AA^1$, instantaneous output due to a phase step of $\theta$, is proportional to $$(\delta x)^2+(\delta y)^2 \propto 1-\cos \theta$$

Omitting a D. C. term, this leads to a total output of the form;

$$J2\left(\frac{2\pi d}{\lambda}\right) \cos 4\pi ft + J4\left(\frac{2\pi d}{\lambda}\right) \cos 8\pi ft + \ldots$$

Thus, we see that output from $AA^1$ is comprised of even harmonics of cyclic commutation frequency, and that output from $BB^1$ contains the fundamental frequency and odd harmonics. In practice, when an odd number of aerials are used, the fact that output is obtained by modulation of a basic pulse rate of $9f$ (for 9 aerials), even terms appear in output from $BB^1$, and odd terms appear at $AA^1$, but rotation of phase with respect to bearing angle has the opposite sense from the terms given in the above series.

The relative amplitudes of fundamental and harmonics of the cyclic commutation frequency at the output terminals $BB^1$, also the relative amplitudes of the harmonics of the cyclic commutation frequency at the output terminals $AA^1$, are evidently dependent upon the dimensions of the aerial system. Most commonly these dimensions will be such that the predominant output from $BB^1$ is the fundamental commutation frequency, and the bearing will be measured by phase comparison of this output with a wave obtained from the aerial commutating device. Under these circumstances it may be that output from $AA^1$ at the second harmonic frequency will have sufficient amplitude to provide more accurate bearing information, but with a single ambiguity. Suitable circuits for convenient cathode ray display of bearings are already well known in the art.

Several incidental advantages accrue from mast-signal rejection circuits, which have the effect of removing errors due to any steady component of unwanted signal. For example accidental signal pick-up from the down-lead of the commutated aerial is automatically removed. "Cross-talk" from the fixed aerial to the input circuits, or elsewhere, of the receiver channel for the commutated aerial can have no significance. Referring to Fig. 3, the common oscillator (107) injection to two receivers often provides difficulty, in that signals in the two receivers can become mixed. The new system could not permit appreciable stray coupling from 101 into 105, but it does avoid all difficulty due to coupling from 105 to 101, so that oscillator "buffering" need only be unidirectional.

A much more important advantage of the new system is its ability to reject constant pick-up through the use of inefficient commutating devices, which may "leak" considerably. Operation of the phase-sampling D. F. system has been seriously restricted for V. H. F. and U. H. F. working, owing to the fact that no really efficient switching device is available. Both crystals and diodes give a serious signal leak due to capacity effects which are difficult to neutralise, so much so, that it has been normal practice to use switches in cascade; this in turn leads to signal reduction and inferior signal to noise ratio. The new system is not affected by a permanent leak from all aerials, the new object of the switches being only to produce moderate but equal modulations of the corresponding signals.

It will be observed that the aerial and receiver arrangement shown in Fig. 3 comprises not merely a circular array and a normal i. e. signal channel receiver, but also an auxiliary aerial 106 and an extra receiver channel. This has the advantage that the phase steps of modulation arising from commutation round the array are independent of the phase of the incoming signal, and the system will respond to signals of incoherent phase just as well as to signals of coherent phase. If it is known that the system will have to deal only with signals of coherent phase, then a simple circular array of aerials will suffice, and the receiver simplified to a single channel receiver with means for transferring the signal modulation to part of the output of reference oscillator 105 in accordance with known technique, and feeding the wave thus obtained to excite circle voltage generator in the same manner as described in connection with Fig. 3.

While the principles of the invention have been described above in connection with specific embodiments, and particular modifications thereof, it is to be clearly understood that this description is made only by way of example and not as a limitation on the scope of the invention.

What I claim is:

1. A radio direction finding system comprising a circular array of aerials, a radio receiver including a frequency doubling stage operative on the received signal, commutator means for cyclically connecting said receiver to different aerials of said array two aerials at a time, means for locally generating a reference wave, means for synchronising said commutator means with said reference wave, and means for obtaining the bearing of a received signal by phase comparison between the phase of a wave derived from the phase modulation of the received signal energy arising from said cyclical connecting and the phase of said reference wave, said cyclical connecting means being so arranged that the effects in said receiver of the reactions from a re-radiating structure centrally located within said array on the two simultaneously connected aerials cancel each other.

2. A system according to claim 1 in which the aerials of said array are opposingly connected in pairs to form a plurality of Adcock pairs, said cyclical connecting means being arranged to connect said receiver to each said Adcock pair in turn.

3. A system according to claim 1, in which said cyclical connecting means comprises two synchronous commutators displaced in positional phase by at least one step of aerial commutation, each said commutator connecting said receiver to all of said aerials in regular succession round the array, the connections made by one of said commutators being of reverse polarity to the connections made by the other of said commutators.

4. A radio direction finding system comprising a circular array of aerials, a radio receiver, commutator means for cyclically connecting said radio receiver to different aerials of said array, means for locally generating a reference wave, means for synchronising said commutator means with said reference wave means for obtaining the bearing of a received signal by phase comparison between the phase of a wave derived from the phase modulation of the received signal energy arising from said cyclical connecting and the phase of said reference wave, and means for suppressing the effect in said receiver of the reaction on said signal energy from a re-radiating structure centrally located within said array.

5. A radio direction finding system comprising a circular array of aerials, a radio receiver, commutator means for cyclically connecting said receiver to different aerials of said array at a given frequency, means for locally generating a reference wave of said given frequency, means for synchronising said commutator means with said reference wave, means for deriving from a received signal a bearing wave of said given frequency corresponding to the phase modulation imposed on the received signal by said cyclical connecting, and means for obtaining the bearing of said signal by phase comparison between said bearing wave and said reference wave, said means for deriving said bearing wave including means for suppressing the effect on said bearing wave arising from the reaction between said aerials and a re-radiating structure centrally located within the circle of the array.

6. A system according to claim 5 in which said means for deriving said bearing wave comprises a local source of stable frequency oscillations, modulation means adapted to angularly-modulate a part of the output of said local source in response to phase modulation of the received signal, a circle voltage generator adapted for excitation by two input waves and for generating a circle voltage which comprises a plurality of separate unidirectional output potentials collectively corresponding to the instantaneous phase difference between the input waves, means for applying the angularly modulated part and an unmodulated part of the output of said local source to said circle voltage generator to serve as said two input waves, a first rectifier arrangement adapted to produce an output wave in response to an applied circle voltage which varies in accordance with cyclical change in phase difference between said input waves, and means for applying each of said unidirectional output potentials to said first rectifier arrangement through a respective correcting circuit, each said correcting circuit comprising in series, in the order given, means for suppressing the steady component of the potential supplied by said circle voltage generator, and D. C. restoration means, whereby said output wave constitutes the desired bearing wave the phase of which is independent of reaction from said central re-radiating structure, and represents the desired bearing unambiguously.

7. A system according to claim 6, in which said circle voltage generator comprises phase-splitting means responsive to one of said two input waves and adapted to produce therefrom four phased outputs the phases of which are relatively spaced at 90° intervals, means for producing four combined waves each comprising a respective one of said phased outputs and a portion of the other of said two input waves, and means for separately rectifying each of said four combined waves.

8. A system according to claim 7, in which said first rectifier arrangement comprises four principal terminals to each of which is applied the D. C. restored output of a respective said correcting circuit, two output terminals connected by a resistance having a central tap, eight equal resistances connected respectively in series with eight rectifiers between each said principal terminal and each said output terminal, and eight equal condensers each of which connects one of said principal terminals with the junction point of the resistance and the rectifier associated with an adjacent principal terminal.

9. A system according to claim 8 further comprising a second rectifier arrangement comprising a second pair of output terminals shunted by a centre-tapped resistance and by four parallel rectifier circuits each comprising two like-poled rectifiers connected in series, four condensers each having one terminal connected to the junction point of the rectifiers of a respective said path, and means for applying each of said unidirectional output potentials to the other terminal of a respective one of said condensers, whereby there is obtained at said second pair of terminals wave the phase of which is independent of reaction from said central re-radiating circuit and which represents ambiguously the desired bearing.

CHARLES WILLIAM EARP.

References Cited in the file of this patent

UNITED STATES PATENTS

| Number | Name | Date |
|---|---|---|
| 2,524,768 | Clark | Oct. 10, 1950 |
| 2,539,413 | Fischer | Jan. 30, 1951 |